United States Patent
Barkman et al.

(10) Patent No.: US 8,627,741 B2
(45) Date of Patent: Jan. 14, 2014

(54) PROCESS TURNING DISC, A ROBOT ARM COMPRISING A PROCESS TURNING DISC, A ROBOT AND A USE OF A PROCESS TURNING DISC

(75) Inventors: Lars Barkman, Västerås (SE); Mattias Lindevall, Västerås (SE); Pascal Cabanne, Södertälje (SE); Peter Bylund, Västerås (SE); Joachim Ljungkvist, Västerås (SE)

(73) Assignee: ABB Technology AB, Västerås (SE)

( * ) Notice: Subject to any disclaimer, the term of this patent is extended or adjusted under 35 U.S.C. 154(b) by 345 days.

(21) Appl. No.: 13/127,535

(22) PCT Filed: Mar. 16, 2009

(86) PCT No.: PCT/EP2009/053089
§ 371 (c)(1),
(2), (4) Date: May 4, 2011

(87) PCT Pub. No.: WO2010/052031
PCT Pub. Date: May 14, 2010

(65) Prior Publication Data
US 2011/0203402 A1 Aug. 25, 2011

(30) Foreign Application Priority Data
Nov. 4, 2008 (EP) .................................. 2008064949

(51) Int. Cl.
*B25J 17/00* (2006.01)
(52) U.S. Cl.
USPC ................. 74/490.04; 74/490.05; 74/490.01; 901/23; 901/29
(58) Field of Classification Search
USPC ............... 74/490.01, 490.02, 490.03, 490.04, 74/490.05; 901/15, 19, 23, 27, 28, 29, 30
See application file for complete search history.

(56) References Cited

U.S. PATENT DOCUMENTS 6,696,810 B2 * 2/2004 Uematsu et al. .......... 318/568.21
7,069,808 B2 * 7/2006 Uematsu et al. ........... 74/490.02
(Continued)

FOREIGN PATENT DOCUMENTS

CN 1781681 A 7/2006
DE 20203095 U1 9/2002
(Continued)

OTHER PUBLICATIONS

PCT/ISA/210—International Search Report—Jun. 26, 2009.
(Continued)

*Primary Examiner* — David M Fenstermacher
(74) *Attorney, Agent, or Firm* — Venable LLP; Eric J. Franklin

(57) ABSTRACT

A process turning disc connectable to an output shaft of a motor configured to rotate the process turning disc about a first center axis of the process turning disc. The process turning disc being configured to guide a cable or hose. A first flange is connectable to an end part of a robot arm. A second flange is connectable to a tool element. The flanges are spaced apart from each other by an intermediate connecting member. The connecting member is connected to the flanges. The connecting member provides a passage between the flanges. The passage is configured to receive and guide the cable/hose. The passage has an inlet side for the cable/hose and an outlet side for the cable/hose. A robot arm including the process turning disc, a robot including the robot arm and a method that utilizes the process turning disc.

16 Claims, 5 Drawing Sheets

(56) References Cited

U.S. PATENT DOCUMENTS

| | | | |
|---|---|---|---|
| 7,121,557 B2 * | 10/2006 | Christie et al. | 277/606 |
| 7,244,895 B1 * | 7/2007 | Borzabadi | 174/650 |
| 7,299,713 B2 * | 11/2007 | Uematsu et al. | 74/490.02 |
| D559,660 S * | 1/2008 | DeCosta et al. | D8/356 |
| 7,322,258 B2 * | 1/2008 | Shiraki et al. | 74/490.05 |
| 7,806,019 B2 * | 10/2010 | Iwai et al. | 74/490.02 |
| 7,810,764 B2 * | 10/2010 | Burlot | 248/75 |
| 7,810,765 B2 * | 10/2010 | Burlot | 248/75 |
| 8,020,467 B2 * | 9/2011 | Haniya et al. | 74/490.02 |
| 8,079,285 B2 * | 12/2011 | Kagawa et al. | 74/490.1 |
| 8,183,475 B2 * | 5/2012 | Dukes et al. | 174/650 |
| 8,357,144 B2 * | 1/2013 | Whitman et al. | 606/1 |
| 8,398,634 B2 * | 3/2013 | Manzo et al. | 606/52 |
| 2005/0011295 A1 | 1/2005 | Shiraki et al. | |
| 2006/0117896 A1 | 6/2006 | Kidooka et al. | |

FOREIGN PATENT DOCUMENTS

| | | |
|---|---|---|
| EP | 1666218 A | 6/2006 |
| JP | 2003311672 A | 11/2003 |
| JP | 2005 288560 A | 10/2005 |
| JP | 2006159372 A | 6/2006 |

OTHER PUBLICATIONS

PCT/ISA/237—Written Opinion of the International Searching Authority—Jun. 26, 2009.
Chinese First Office Action—Jul. 1, 2013 (Issued in Counterpart Application No. 200910221123.7).

* cited by examiner

PROCESS TURNING DISC, A ROBOT ARM COMPRISING A PROCESS TURNING DISC, A ROBOT AND A USE OF A PROCESS TURNING DISC

CROSS-REFERENCE TO RELATED APPLICATIONS

This application claims priority under 35 U.S.C. §119 to International patent application PCT/EP2008/064949 filed 4 Nov. 2008 and is the national phase under 35 U.S.C. §371 of PCT/EP2009/053089 filed 16 Mar. 2009.

FIELD OF THE INVENTION

The present invention relates to a process turning disc for a robot arm. The present invention also relates to a robot arm comprising said process turning disc, and to a robot. Further, the present invention relates to a use of said process turning disc.

BACKGROUND OF THE INVENTION

In different industries, e.g. manufacturing industry, robots have been used for decades. Specifically, robots have been a useful tool in order to automate processes and thus increase both productivity and efficiency. Known robots can have an arm connected to a body, which arm is moved in accordance with a preset program. The arm can hold a tool designed to carry out a desired work or process, e.g. welding of a material. Tools connected to a robot arm usually operate by use electricity or some other source of power, e.g. pressurized air. The power can be provided to the tool via a cable along the arm. Different cables and hoses are also needed for other purposes, and therefore a whole package of cabling, often called dress package, is normally drawn along the robot arms, from the base or foot of the robot to the end of the upper arm, to the wrist and the tool.

The end part of a robot arm according to prior art is provided with a wrist. The wrist is provided with a process turning disc and a tool is mounted on the process turning disc. The wrist is provided with a motor, and the output shaft of the motor rotates the process turning disc and the tool about a centre axis, which also extends through the wrist. The type of tool that is mounted on the wrist is decided by the customer. The wrist is also rotatable/tiltable about another centre axis that is perpendicular to the mentioned centre axis.

Commonly, the cable along the arm is attached to the arm at points spaced apart from each other, and further on to the wrist and the tool. The cable is arranged in a non-stretched manner between the points, which enables the arm to have a fairly high range of free movement without being limited by the cable. A cable as above is exposed to wear, mainly due to friction against different parts of the arm. This results in that the cable has to be changed and replaced after a period of use.

OBJECT AND SUMMARY OF THE INVENTION

An object of the present invention is to provide an improved process turning disc for a robot. Another object is to provide a compact unit of cable together with arm, which enables the robot to operate in narrow spaces which are difficult to move within.

The cables in this context relate primarily to process cables intended for power and signals, conduits or hoses for liquids and gases, as well as empty bendable protective casings arranged for future laying of one or more conduits, hoses and cables. Whenever the term cable is used in the following description and claims, it is meant to comprise a single cable or hose or several cables and hoses that may be used for different purposes, e.g. in a dress package, as indicated above. The term cable is also meant to comprise different types of cable guidance hosing or protective casing inside which a number of different cables or hoses are gathered.

According to the invention is defined a process turning disc, connectable to an output shaft of a motor by means of which the process turning disc is rotatable about a first centre axis of the process turning disc, and configured for guiding a cable or hose, comprising a first flange connectable to an end part of a robot arm and a second flange connectable to a tool element, wherein the flanges are spaced apart from each other by an intermediate connecting member, the connecting member being connected to the flanges, and the connecting member providing a passage between the flanges, which passage is configured for receiving and guiding the cable/hose and said passage having an inlet side for the cable/hose and an outlet side for the cable/hose.

An achieved advantage of the invention is that the cable is both guided by the process turning disc and protected.

According to one feature, the process turning disc may be directly connectable to an output shaft of a motor by means of which the process turning disc is rotatable about the first centre axis of the process turning disc.

According to another feature, the end part of a robot arm is a wrist part and the process turning disc is integrated in the wrist part. Thus the inventive process turning disc can easily replace an ordinary process turning disc.

According to another feature, the passage has an inner wall forming part of the connecting member and extending between the first flange and the second flange, and at least a part of said inner wall is curved in relation to the first centre axis. The curved inner wall has the advantage of being more merciful to the cable with less wear as the result.

According to yet another feature, at least a part of the inner wall of the passage is curved in relation to a second centre axis of the passage, which second centre axis is perpendicular to the first centre axis.

According to one embodiment, the first centre axis passes through the connecting member and through the centres of the flanges.

According to another embodiment, the passage in the connecting member is a through passage, and the connecting member at one end of the passage forms an inlet configured for receiving the cable/hose and at the other end of the passage forms an outlet for the cable/hose According to a feature of this embodiment, the cross section area of the inlet is larger than the cross section area of the outlet, wherein the cross section area of the passage per a unit of length along the passage tapers in the direction from the inlet towards the outlet. Thus, the inlet has a form that is made wider compared to the outlet, whereby a funnel-like shape is obtained. Such a form, or shape, helps to reduce possible wear of the through cable caused by friction against any edge between the inlet and the passage.

According to a further feature of this embodiment, the passage has an inner wall extending between the first flange and the second flange at a distance from and on both sides of the first centre axis, and at least a part of the inner wall of the passage is curved.

According to a further feature of the invention, the flanges and the connecting member form one unit. The process turning disc can be made from one piece of material and shaped in accordance with known technologies. An effect of this is that production of the process turning disc can be optimised as no parts need to be assembled against each other to form one unit.

According to another feature, a wear element is arranged on a surface of a flange facing the opposite flange in the area of the inlet. The wear element may be detachably arranged. During movement of the robot arm the cable is exposed to wear by friction in the space and area of the inlet against internal surfaces of the flanges. A wear element, arranged at one of the internal surfaces, prevents that the process turning disc is worn out due to friction from the cable against the process turning disc. The choice of the material in the wear element can be selected such that, when the wear element is worn out this could e.g. be an indication that that the robot needs service.

According to another feature, a tool element may be detachably arranged to the second flange via a quick mounting tool. An effect of this is that it serves as a fast "snap-on" function, when the tool has to be changed. Change of tool is normally a quite time consuming procedure. Therefore, the use of this quick mounting tool enables a user to save time as the tool more rapidly can be changed.

According to another aspect of the present invention is defined a robot arm comprising a process turning disc having any one of the above mentioned features. Further, the process turning disc may be arranged at an end part of the robot arm, which end part is movably connected to a second part of the robot arm, wherein a cable leading from the second part of the robot arm to the process turning disc at least partly is positioned inside the second part of the robot arm, and guided through a passage in the process turning disc. By providing the cable inside the robot arm and through the process turning disc, the robot arm including the cabling, has a smaller, or narrower, cross section area when compared to the corresponding area required for prior art robot arms with external cabling. This results in that the robot arm is more compact than other known robot arms and thus can work in more narrow places.

According to another aspect of the present invention is defined a robot comprising a robot arm having any one of the above defined features. Robots comprising a robot arm with above defined features have the advantage that they can work with a higher efficiency in more narrow spaces than prior art robots, due to that the cable is guided through the process turning disc and inside the arm, which results in that the robot arm can be more compact.

According to another aspect of the present invention, the process turning disc with said features can be used in the production of a product using any process involving welding, soldering, material tooling, clenching, gluing, painting, pressing, punching, or/and material handling.

BRIEF DESCRIPTION OF THE DRAWINGS

The present invention will now be described by reference to embodiments, given as examples only, as schematically illustrated by the drawings.

The drawings embody the invention and shows only details necessary for understanding the invention.

DETAILED DESCRIPTION OF THE INVENTION

Figure 1:
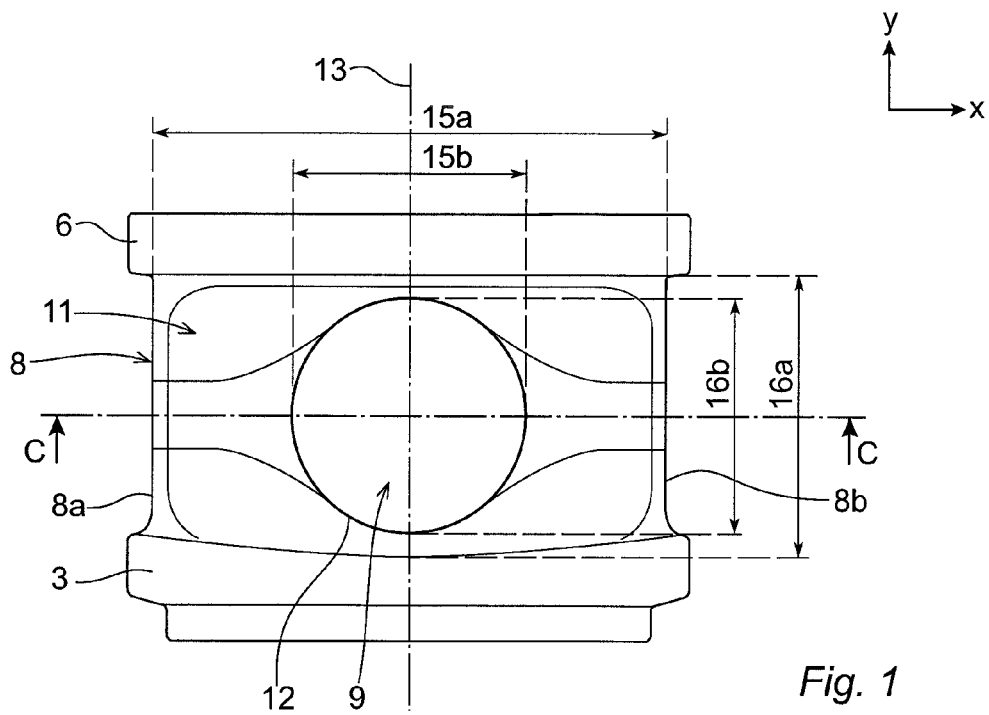
FIG. 1 shows a side view of a first embodiment of a process turning disc according to the present invention, viewed through a passage via an inlet towards an outlet.
Figure 8:
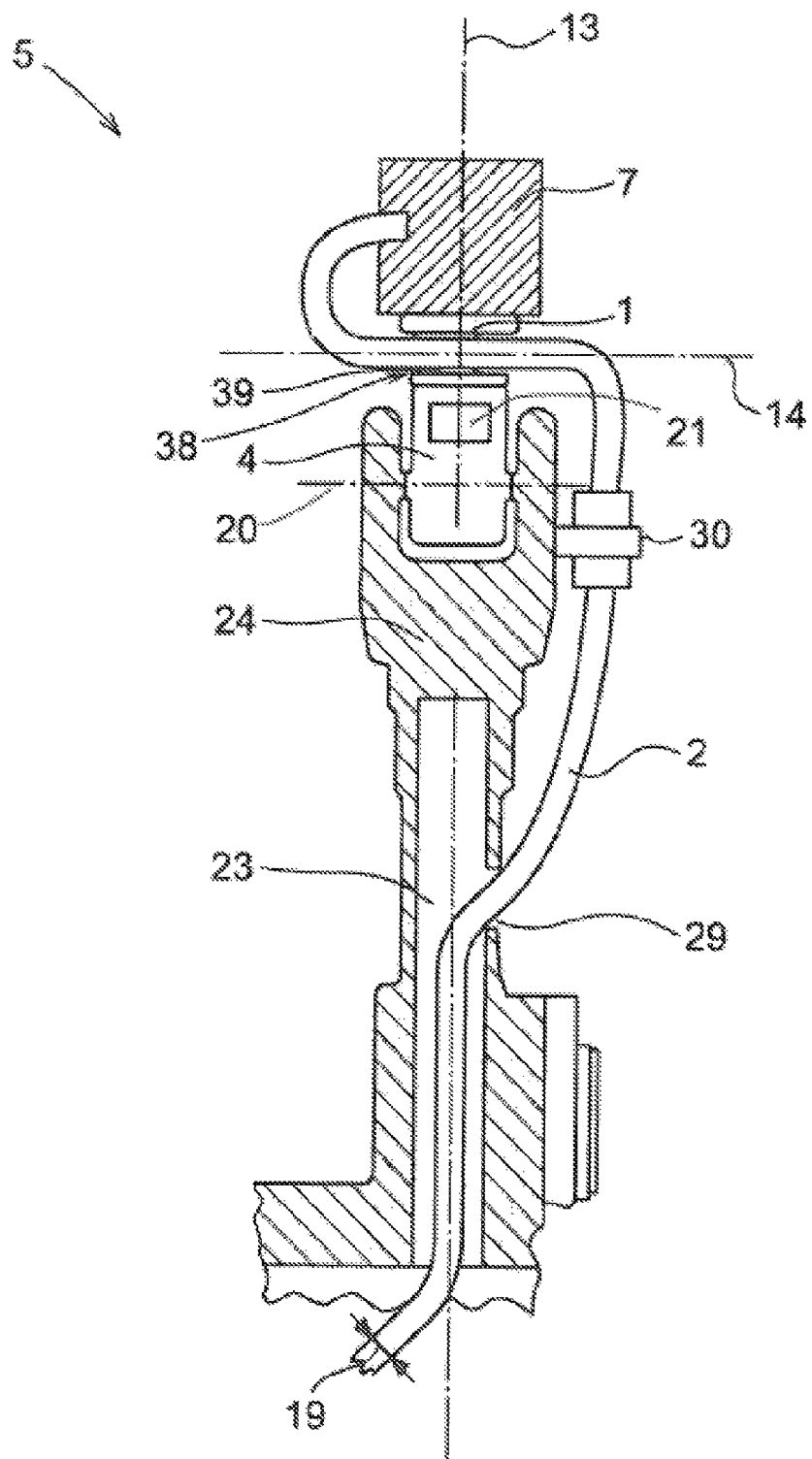
FIG. 8 shows a cross section view of a robot arm comprising a process turning disc according to the invention.

FIG. 1 shows a first embodiment of a process turning disc 1 with an integrated cable/hose guiding arrangement according to the present invention, intended to be used on a robot arm 5 in accordance with FIG. 8. The process turning disc 1 comprises a first flange 3, a second flange 6, and an intermediate connecting member 8 between the flanges 3, 6. The process turning disc is connectable to an end part 4 of a robot arm 5 by means of the first flange 3. By means of the second flange 6, the process turning disc is connectable to a tool element 7. Further details will be given in connection with the description related to FIG. 8.

The intermediate connecting member 8 comprises a first wall part 8a and a second wall part 8b. The intermediate connecting member with the wall parts 8a, 8b form a passage 9 for the cable/hose together with the flanges 3, 6. The passage 9 comprises an inlet side for the cable/hose with an inlet 11 and an outlet side for the cable/hose with an outlet 12. The outlet 12 has a centred position in the intermediate connecting member 8 whereby a first wall part 8a of the intermediate connecting member is arranged on one side of the outlet 12, and a second wall part 8b of the intermediate connecting member is arranged on the other side of the outlet 12. The two flanges 3, 6 are positioned in parallel and opposite each other, perpendicular to a first centre axis 13 extending through the flanges 3, 6.

The inlet 11 has a width 15a, which is greater than the width 15b of the outlet 12. The width 15b of the outlet 12 represents its diameter. The inlet 11 has a height 16a that is greater than the height 16b of the outlet 12. As the outlet 12 has a circular shape, the height 16b of the outlet also represents its diameter. In other words, the cross section area of the outlet 12 is circular and having a diameter with a length 15b that is shorter than the width 15a of the cross section area of the inlet 11. An effect of the circular outlet is to provide the cable through the outlet in a fairly static manner, as the cable is elongated and connected to the tool element 7. The tool element and the process turning disc are configured to be static in relation to each other. Reduction of loose between the cable and the edge of the outlet enables the cable to be kept in said static manner, whereby wear of the cable is reduced.

The cross section area of the inlet 11 has an elongated form with the width 15a, perpendicular to the first centre axis 13, being longer than the height 16a, which is parallel to the first centre axis 13.

The cross section area of the inlet 11 is larger than the cross section area of the outlet 12, and the cross section area of the passage 9 per a unit of length along the passage is tapered in the direction from the inlet 11 towards the outlet 12.

As can be seen from the figures, the inlet 11 and the passage 9 receive a form of a flattened funnel or cone. The funnel like shape avoids sharp edges of the inlet into the passage. An inlet with edges at the passage might cause wear against the cable through the passage. This would especially be the case when a cable positioned through a passage is bent away from a centre axis through the passage, whereby it wears against the edge of the inlet of the passage.

Figure 2:
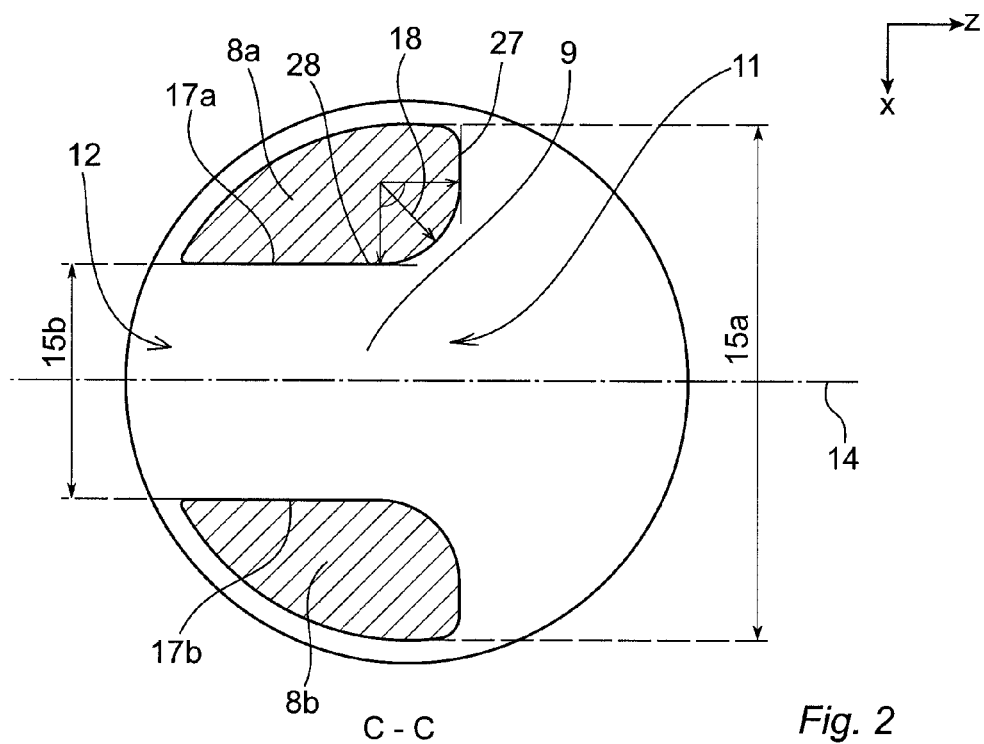
FIG. 2 shows a cross section view along line C-C of the process turning disc in FIG. 1.
Figure 3:
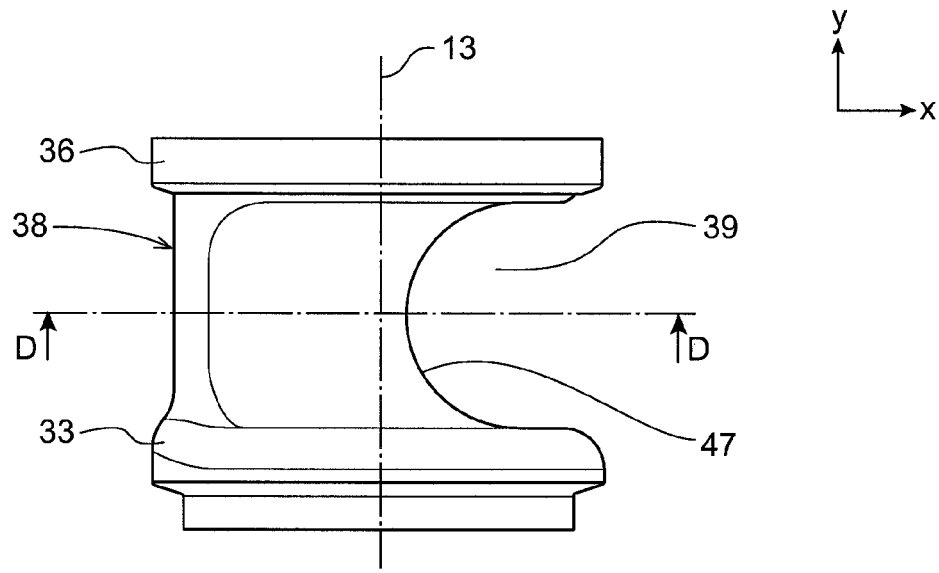
FIG. 3 shows a side view of a second embodiment of a process turning disc according to the present invention.

FIG. 2 shows the process turning disc 1 in a cross section view along C-C of FIG. 1, through a second centre axis 14 extending through the passage. The passage 9 is centred through the process turning disc 1 between the flanges 3, 6. The second centre axis 14 extends through the passage 9 and through the inlet 11 and the outlet 12. The second centre axis 14 is perpendicular to the first centre axis 13.

The passage 9 has an inner wall 17a, 17b comprising two inner wall parts formed by the respective wall parts 8a, 8b of the intermediate connecting member, and extending between the first flange 3 and the second flange 6, at a distance from and arranged essentially on each side of the second centre axis 14.

The inlet 11 of the passage 9 is formed between the opposite flanges 3, 6 and the wall parts 8a, 8b of the intermediate connecting member. The outlet 12 is formed opposite the inlet 11 in the intermediate connecting member 8. Said intermediate connecting member 8 has an outer surface comprising the outlet 12. The surface faces away from the process turning disc 1 and extends around the process turning disc 1, covering at least 180 degrees around the periphery of the process turning disc 1, as can be seen in FIG. 2.

The view in FIG. 2 is a cross section view in a plane parallel to the flanges 3, 6 along C-C in FIG. 1. The plane is aligned with the second centre axis 14 through the passage 9. The inner walls 17a, 17b of the passage 9 in the area of the inlet 11 shows a curvature on each side of the second centre axis 14, whereby the passage 9 and the inlet 11 are tapered having a funnel or cone like shape. The passage may also have a straight part between the inlet and the outlet. The curvature of the inner wall 17a, 17b has a radius 18, which at least corresponds to a radius 19 of a cable/hose 2 arranged through the passage 9 (in analogy with FIG. 8). A flexible cable can be bent, or curved, with a curvature that at least has the same radius as the radius of the cable without being ruptured. For this reason the passage has a curvature that at least corresponds to the radius of a cable arranged through the passage.

Also, in the plane described above, the curved inner walls 17a, 17b have a radius corresponding to a radius of the outlet. Said curved wall has the form of an arc length in the plane, wherein the arc length has a circular sector angle larger than 0 degrees. The radius 18 of the inner wall 17a, 17b, seen in the plane of FIG. 2, curves from the inlet 11, with respect to the second centre axis 14, having a first tangent 27 mainly perpendicular to the second centre axis 14. The curvature of the inner wall 17a, 17b continues towards the second centre axis 14, towards the outlet 12, until the curvature with a second tangent 28 is mainly parallel with said second centre axis 14. This can also be described in terms of a distance between an inner wall 17a, 17b of the passage 9 and the second centre axis 14 varying per unit of length along the second centre axis. In a plane, perpendicular to the first centre axis 13 and coinciding and parallel with the second centre axis 14, the passage has a decrease of the distance in the plane between the opposite inner walls along the second centre axis in direction towards the outlet from the inlet. The passage 9 is preferably symmetric along the second centre axis 14 in the plane, whereby the distance on one side of the centre axis to the inner wall corresponds to the distance on the other side of the centre axis to the opposite inner wall.

The cable/hose is guided by being inserted at the inlet 11 and further through the passage 9 and further on out from the process turning disc via the outlet 12. The wide inlet with its curved walls and the curved inner walls of the passage guide the cable and facilitate the insertion of the cable.

FIGS. 3-6 illustrate a second embodiment of a process turning disc 1 with an integrated cable/hose guiding arrangement according to the present invention, suitable to be used on a robot arm 5 in accordance with FIG. 8. The process turning disc 1 comprises a first flange 33, a second flange 36, and an intermediate connecting member 38 between the flanges 33, 36. The process turning disc is connectable to an end part 4 of a robot arm 5 by means of the first flange 33. By means of the second flange 36, the process turning disc is connectable to a tool element 7. Further details will be given in connection with the description related to FIG. 8.

Figure 4:
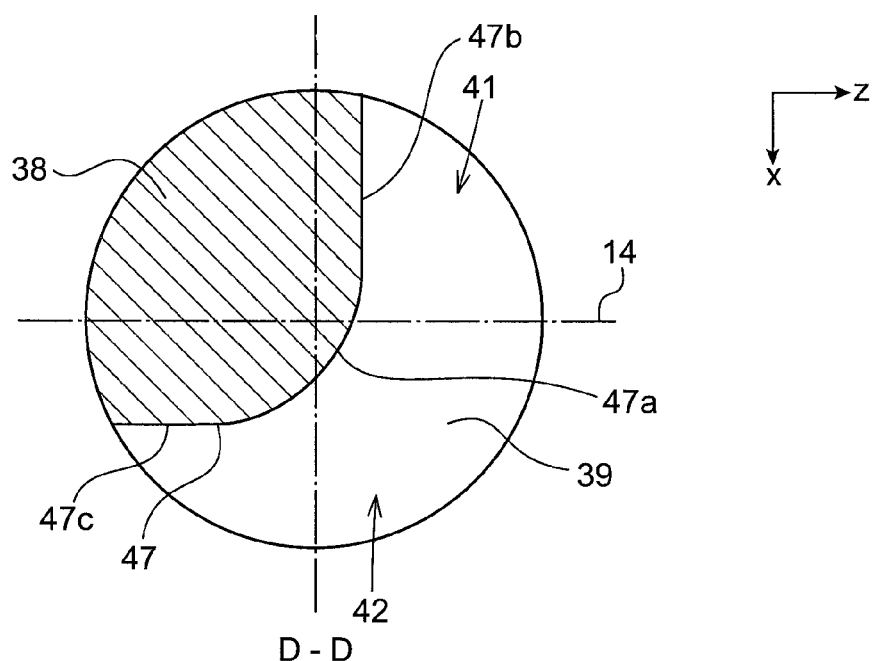
FIG. 4 shows a cross section view along line D-D of the process turning disc in FIG. 3.
Figure 5:
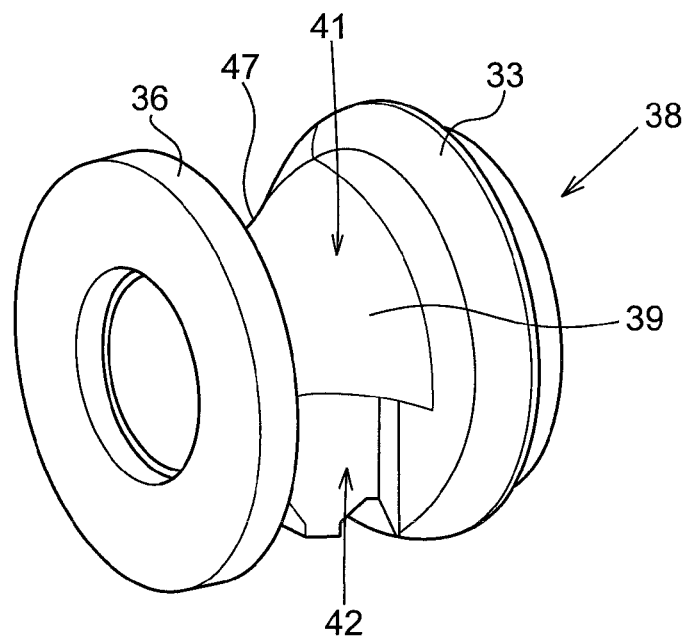
FIG. 5 shows a perspective view of the process turning disc according to a variant of the second embodiment.

Also in this embodiment, the intermediate connecting member 38 forms a passage 39 for the cable/hose together with the flanges 33, 36. The passage 39 comprises an inlet side 41 for the cable/hose and an outlet side 42 for the cable/hose. The two flanges 33, 36 are positioned in parallel and opposite each other, perpendicular to a first centre axis 13 extending through the flanges 33, 36. The passage 39 has an inner wall 47 forming part of the connecting member 38 and extending between the first flange 33 and the second flange 36. At least a part of the inner wall is curved in relation to the first centre axis 13. In FIG. 4 is also shown a second centre axis 14 of the passage, which is perpendicular to the first centre axis 13. This second centre axis 14 is a centre axis in the respect that a plane going through the axis 14 and being perpendicular to the axis 13 is centred in the vertical direction (y) of the passage. Also at least a part of the inner wall 47 of the passage 39 is curved in relation to a second axis 14. The passage 39 is centred around the second centre axis 14 when looking at the process turning disc from a side view as in FIG. 3, but its cross section is not centred around the second centre axis 14, as can be seen in FIG. 4. As can be seen from the FIGS. 3-6, the passage 39 in this second embodiment only has one inner wall 47, and the other side of the passage is open. The intermediate connecting member 38 is offset from the first centre axis 13 of the process turning disc, in the sense that its shape is not centred around the first centre axis 13. The first centre axis 13 passes through the connecting member 38 and through the centres of the flanges 33, 36.

The cable/hose is guided into the inlet side 41 of the passage 39 and further on in the passage along at least part of the curved inner wall 47, and further out from the passage via the outlet side 42. In the illustrated second embodiment, the inner wall has a central wall portion 47a that is curved around the first centre axis 13, and from this curved central wall portion, two essentially straight wall portions 47b, 47c extend towards the inlet side 41 and the outlet side 42 respectively. These straight wall portions 47b, 47c form an essentially right angle relative each other, and are essentially parallel to the centre axis 13.

Figure 6:
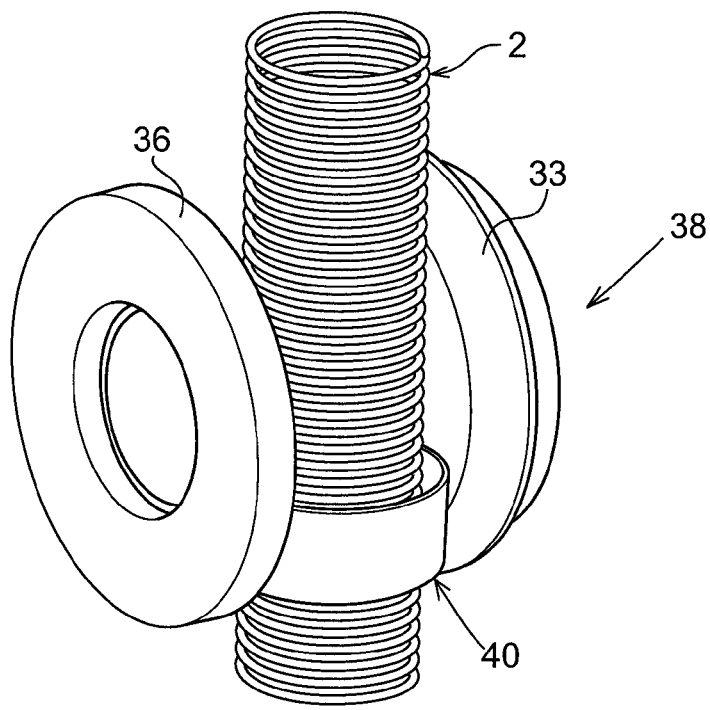
FIG. 6 shows a perspective view similar to FIG. 5, but with a cable mounted to the process turning disc.

In FIG. 6 is illustrated how a cable 2 is guided in the passage 39 of the process turning disc. As illustrated, an attachment device 40, e.g. a clamp or similar, may be used for securing the cable to the process turning disc, if required.

Figure 7:
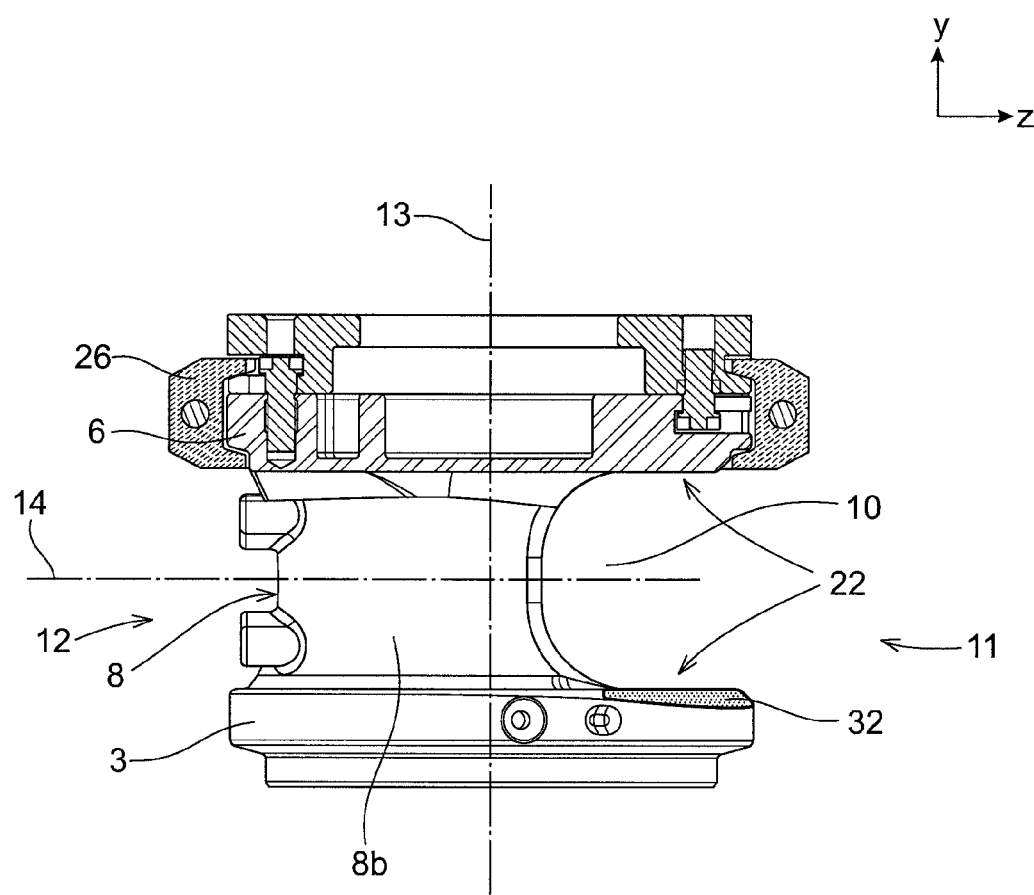
FIG. 7 shows a process turning disc according to the present invention, comprising a quick mounting tool.

FIG. 7 shows the process turning disc 1 provided with a quick mounting tool 26, which is optional. Either one of the embodiments of the process turning disc may be used. The quick mounting tool 26 is arranged around and in connection with the second flange 6. The quick mounting tool 26 is an element that enables easy and rapid fixation of tools to the process turning disc 1. The quick mounting tool 26 serves as a universal tool. An example of a quick mounting tool is e.g. described in patent document WO 03/033220 A1. It would also be conceivable to use an automatic tool changer or of course simply connect the naked flange to the tool.

In the area of the inlet 11 and the space 10 formed between the opposite flanges 3, 6, on at least one opposite surface 22 of said flanges 3, 6, at least one wear element 32 is arranged. The wear element 32 can be detachable such that it can be removed when worn out and replaced by a new wear element.

FIG. 8 shows a robot arm 5 comprising an end part 4 and a second part 24 of the robot arm 5. In the illustrated example, the first end part 4 is a wrist provided with a tilt part, and the second part 24 of the robot arm is an upper robot arm part. The second part 24 is connected to another part of the robot, such as a lower robot arm part or e.g. a body part of the robot (not shown in Figure). The wrist 4 is rotatable/tiltable about an axis 20, and thereby it is movably connected to the second part 24 of the robot arm. On the outer end of the wrist, a process turning disc 1 is arranged, by the first flange 33 of the process turning disc being connected to the wrist. The process turning disc is illustrated as according to the second embodiment, but may equally be according to the first embodiment. A tool element 7 is mounted on the process turning disc 1, via a quick mounting tool. However, the quick mounting tool is optional. The wrist is also provided with a motor 21, and the output shaft of the motor rotates the process turning disc 1 and the tool 7 about the first centre axis 13, which also extends through the wrist. The process turning disc may be directly connectable to the output shaft of the motor 21. Further, the process turning disc may be integrated in the wrist part. Normally, when a robot is delivered to a customer, it would be delivered with the wrist having a process turning disc already mounted to the wrist. The process turning disc is not normally a part that the customer would mount himself. The process turning disc according to the invention would be integrated in the wrist in the same way as prior art turning discs, and would replace a regular, prior art, turning disc.

In FIG. 8 is also illustrated how the robot arm 24 is designed to have the cable 2 at least partly positioned inside the arm. The cable 2 extends partly through an internal space 23 in the second part 24 of the robot arm 5. The cable 2 exits from the second part 24 by an opening 29 located on the side of the second part 24. From the opening 29 the cable 2 extends via a guiding device 30. From the guiding device 30 the cable 2 extends to the process turning disc 1, here illustrated according to the second embodiment, and through said process turning disc 1, via the passage 39. After passage of the cable 2 through the process turning disc 1, the cable 2 extends to the tool element 7 for delivery of e.g. electricity, fluids, or pressurised air to make the tool element 7 operate properly and perform desired tasks.

The invention is not limited to the embodiment referred to but may be varied and modified within the scopes of the claims set out below, as has been partly described above.

In the claims, any reference signs placed between parentheses shall not be interpreted as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A process turning disc connectable to an output shaft of a motor configured to rotate the process turning disc about a first center axis of the process turning disc, and wherein the process turning disc is configured to guide a cable or hose, the turning disc comprising:
    a first flange connectable to an end part of a robot arm,
    a second flange connectable to a tool element, and
    an intermediate connecting member configured to space apart the flanges from each other, the connecting member being connected to the flanges such that the flanges extend along opposite sides of the connecting member, and the connecting member providing a passage between the flanges, wherein the passage is configured to receive and guide the cable or hose such that the cable or hose extends between the flanges, and wherein said passage having an inlet side for the cable or hose and an outlet side for the cable or hose.

2. The process turning disc according to claim 1, wherein the process turning disc is directly connectable to an output shaft of a motor configured to rotate the process turning disc about the first center axis of the process turning disc.

3. The process turning disc according to claim 1, wherein said end part of a robot arm is a wrist part, and wherein the process turning disc is integrated in the wrist part.

4. The process turning disc according to claim 1, wherein the passage has an inner wall forming part of the connecting member and extending between the first flange and the second flange, and wherein at least a part of said inner wall is curved in relation to the first center axis.

5. The process turning disc according to claim 4, wherein at least a part of the inner wall of the passage is curved in relation to a second center axis of the passage, which second center axis is perpendicular to the first center axis.

6. The process turning disc according to claim 1, wherein the first center axis passes through the connecting member and through the centers of the flanges.

7. The process turning disc according to claim 1, wherein the passage in the connecting member is a through passage, and wherein the connecting member at one end of the passage forms an inlet configured to receive the cable or hose and at the other end of the passage forms an outlet for the cable or hose.

8. The process turning disc according to claim 7, wherein a cross section area of the inlet is larger than a cross section area of the outlet, and wherein the cross section area per a unit of length along the passage tapers in direction from the inlet towards the outlet.

9. The process turning disc according to claim 7, wherein the passage has an inner wall extending between the first flange and the second flange at a distance from and on both sides of the first center axis, and wherein at least a part of the inner wall of the passage is curved.

10. The process turning disc according to claim 1, wherein the flanges and the connecting member form one unit.

11. The process turning disc according to claim 1, further comprising:
    a wear element arranged on a surface of a flange facing an opposite flange in the area of the inlet.

12. The process turning disc according to claim 1, further comprising:
    a tool element detachably arranged to the second flange via a quick mounting tool.

13. A robot arm, comprising:
    a process turning disc connectable to an output shaft of a motor configured to rotate the process turning disc about a first center axis, wherein the process turning disc is configured to guide a cable or hose, the process turning disc comprising a first flange connectable to an end part of a robot arm, a second flange connectable to a tool element, and an intermediate connecting member configured to space apart the flanges from each other, the connecting member being connected to the flanges such that the flanges extend along opposite sides of the connecting member, and the connecting member providing a passage between the flanges, wherein the passage is configured to receive and guide the cable or hose such that the cable or hose extends between the flanges, and wherein said passage having an inlet side for the cable or hose and an outlet side for the cable or hose.

14. The robot arm according to claim 13, wherein the process turning disc is arranged at an end part of the robot arm, wherein the end part is movably connected to a second part of the robot arm, and wherein a cable leading from the second part of the robot arm to the process turning disc at least partly is positioned inside the second part of the robot arm and guided through a passage in the process turning disc.

15. A robot, comprising:
a robot arm comprising a process turning disc connectable to an output shaft of a motor configured to rotate the process turning disc about a first center axis, wherein the process turning disc is configured to guide a cable or hose, the process turning disc comprising a first flange connectable to an end part of a robot arm, a second flange connectable to a tool element, and an intermediate connecting member configured to space apart the flanges from each other, the connecting member being connected to the flanges such that the flanges extend along opposite sides of the connecting member, and the connecting member providing a passage between the flanges, wherein the passage is configured to receive and guide the cable or hose such that the cable or hose extends between the flanges, and wherein said passage having an inlet side for the cable or hose and an outlet side for the cable or hose.

16. A method for production of a product using any process involving welding, soldering, material tooling, clenching, gluing, painting, pressing, punching, or/and material handling, the method comprising:
connecting a process turning disc to an output shaft of a motor, wherein the turning disc comprises a first flange connectable to an end part of a robot arm, a second flange connectable to a tool element, and an intermediate connecting member configured to space apart the flanges from each other, the connecting member being connected to the flanges such that the flanges extend along opposite sides of the connecting member, and the connecting member providing a passage between the flanges;
receiving and guiding a cable or hose with the passage such that the cable or hose extends between the flanges, wherein the passage comprises an inlet side for the cable or hose and an outlet side for the cable or hose;
guiding the cable or hose with the turning disc; and
rotating the process turning disc about a first center axis of the process turning disc utilizing the motor.

* * * * *